United States Patent [19]

Trimble

[11] Patent Number: 4,997,337

[45] Date of Patent: Mar. 5, 1991

[54] HIGH-SPEED MAIL STACKING AND SEPARATING APPARATUS

[75] Inventor: Don K. Trimble, Orinda, Calif.

[73] Assignee: Rubber Band Technology, Ltd., Yakima, Wash.

[21] Appl. No.: 252,142

[22] Filed: Oct. 3, 1988

[51] Int. Cl.[5] .............................................. B65G 57/03

[52] U.S. Cl. .............................. 414/790.4; 414/790.6; 414/790.8; 414/924; 209/900; 198/418.6; 198/624; 271/178; 271/192

[58] Field of Search ............... 414/789.9, 790.4, 790.5, 414/790.6, 793.9, 794.2, 794.4, 790.8, 923, 924; 209/900, 584; 198/418.6, 465.1, 624; 271/178, 192; 53/540

[56] References Cited

U.S. PATENT DOCUMENTS

| | | | |
|---|---|---|---|
| 3,154,307 | 10/1964 | Williamson | 414/788.3 |
| 3,205,794 | 9/1965 | Califano et al. | 414/790.6 X |
| 3,532,230 | 10/1970 | Gutberlet et al. | |
| 3,599,807 | 8/1981 | Hedrick et al. | 271/86 |
| 3,861,537 | 1/1975 | Duchinsky et al. | 271/177 |
| 4,159,761 | 7/1979 | Egee et al. | 414/790.4 X |
| 4,162,723 | 7/1979 | Kupper | 198/465.1 X |
| 4,167,476 | 9/1979 | Jackson | 209/900 X |
| 4,311,090 | 1/1982 | Dudziak et al. | 414/790.4 X |
| 4,384,813 | 5/1983 | Smith et al. | 414/790.6 X |
| 4,460,169 | 7/1984 | Bartesaghi | 271/192 |
| 4,551,052 | 11/1985 | Pattarozzi | 414/793.9 |
| 4,562,650 | 1/1986 | Nagasawa et al. | 271/192 |
| 4,579,027 | 4/1986 | Lewis | 83/28 |
| 4,601,155 | 7/1986 | Lewis | 53/176 |
| 4,601,394 | 7/1986 | Hutner | 209/900 X |
| 4,668,149 | 5/1987 | Sloan | 271/192 X |

FOREIGN PATENT DOCUMENTS

| | | | |
|---|---|---|---|
| 0028324 | 5/1981 | European Pat. Off. | 414/790.4 |
| 1035057 | 7/1958 | Fed. Rep. of Germany | 414/793.9 |
| 2051666 | 4/1972 | Fed. Rep. of Germany | 414/794.4 |
| 2223005 | 2/1973 | Fed. Rep. of Germany | |
| 1375835 | 11/1974 | United Kingdom | 198/624 |

*Primary Examiner*—Robert J. Spar
*Assistant Examiner*—William M. Hienz
*Attorney, Agent, or Firm*—Flehr, Hohbach, Test, Albritton & Herbert

[57] ABSTRACT

A high-speed mail stacking and separating apparatus (29) and method including a stack forming assembly (41) mounted for movement from a stack forming position to a stack releasing position. In the improved stacking apparatus, the stack forming assembly (41) is a low-inertia assembly mounted for movement during the time interval between sequentially adjacent envelopes (42) to positively displace the stack (S) out of the stacking zone (Z) to enable a new stack to be formed. The stack forming assembly (41) includes a pair of counter-rotating star wheels (52,53) having a plurality of Y-shaped arms (56) with one leg (57) of each arm (56) acting as the stack supporting leg and the other leg (58) of each arm (56) acting as the stack impelling leg. A conveyor (43) for conveying the stack (S) from the stack forming assembly (41) to a banding assembly (31) also is disclosed.

4 Claims, 5 Drawing Sheets

FIG. I

HIGH-SPEED MAIL STACKING AND SEPARATING APPARATUS

TECHNICAL FIELD

The present invention relates, generally, to an apparatus and method for stacking and separating sheet-like items, such as envelopes, and more specifically the present invention relates to an apparatus and method for high-speed, automatic stacking of mail in stacks and making breaks in and starting new stacks based upon ZIP codes.

BACKGROUND ART

To take advantage of special postal pre-sort rates for mass mailings, mail must be sorted and banded in stacks of at least 10 pieces, with each envelope in each stack being addressed to an address in the same ZIP code. Prior art computer-controlled, automated mailing systems have been developed which have the capacity of printing and separating mail at relatively high speeds, for example, 6,000 pieces per hour. Computer generated statements and invoices for large public utilities or department stores often are mailed using such automated mailing systems.

Typically automated high-speed mailing systems will print a statement or document at a computer printer on computer form paper. The individual statements are separated at a burster, which also may fold the statements. Thereafter, a collator/inserter will add additional documents, such as advertisements and return envelopes, and insert the assembled statement and documents into an envelope. The envelope will be sealed and postage applied at a postage meter mailing machine. The mail exits from the postage meter mailing machine with envelopes being fed serially into a stacker. The stacked envelopes are conveyed to an automated banding apparatus or manual banding stations for the application of one or two rubber bands around the mail stack. Once banded, the mail can be delivered to a postal facility and will be entitled to bulk mailing postal rates.

The ability of take advantage of the lower bulk mailing postal rates is quite significant. A standard one ounce letter currently has a regular postal rate of twenty-five cents. If mail is stacked in bundles having at least ten pieces, but not having a height exceeding three and one-half inches, and if all of the pieces of the mail in the stack have the same ZIP code, a bulk rate of twenty-one cents per one ounce piece of mail can be used. If the mail is further pre-sorted into stacks separated by carrier route, that is, the same ZIP code and the same four additional carrier route numbers, the mail will be entitled to a rate of eighteen cents per one ounce piece.

Known prior art automated apparatus and processes for assembling and inserting mail into envelopes and applying postage thereto have been generally satisfactory. The limiting area in such automated systems has generally been the stacking and ZIP code-based sorting of mail. Some automated mailing facilities utilize manual labor for the stacking and banding operations, but occupational injuries and increased labor costs have encouraged the use of automated stacking and banding equipment.

One automated prior art mail stacking and separating apparatus has employed a plurality of mail collecting trays or pockets that are mounted on a conveyor chain. Envelopes discharged sequentially from the postage meter mailing machine are discharged into a mail receiving tray or pocket until at least ten pieces and not more than three and one-half inches of mail are stacked in the pocket. The entire conveyor is then moved to position the next tray or pocket for receipt of the next stack of mail.

The problem which has been encountered with this automated mailing system arises from the fact that the envelopes are discharged at a constant, relatively high rate from the postage machine. Thus, the stacking apparatus must move the filled tray from its position for receiving mail and move an empty tray into position to receive mail, all during the interval between sequentially adjacent envelopes.

If an envelope is nine and one-half inches long and is spaced from the next envelope by one inch, the stacking conveyor must be capable of advancing a new tray into position to receive the next piece of mail in less than 0.06 seconds for a postage meter mailing machine operating at 6,000 pieces of mail per hour. Since the entire conveyor belt and all of the trays must be simultaneously moved during this very short interval, a powerful conveyor drive motor is required to overcome the inertia at rest of the conveyor, even though the distance moved is not that great. Rapid and accurate displacement of the conveyor, however, is difficult to achieve, and the cost of such a powerful motor and controls for the same is substantial. Moreover, 6,000 pieces per hour is close to the maximum practical limit possible using such a stacking conveyor.

Not only would it be highly desirable to have a mail stacking apparatus which could accommodate existing high-speed postage machines, there already are labelers which will operate at 35,000 pieces per hour and web press printing machines that operate at 60,000 to 70,000 pieces per hour. Accordingly, there is considerable need to increase the rate at which stacking and sorting of mail or similar printed matter can be accomplished.

Other forms of apparatus for the stacking of sheet material are found in the prior art, but such apparatus has been used for items such as newspapers, shingles, napkins, plaster board and the like, not mail. Typical of such prior art sheet stacking apparatus are the devices shown in U.S. Pat. Nos. 3,205,794; 3,532,230; 3,599,807; 3,861,537; 4,460,169 and 4,562,650.

U.S. Pat. No. 3,205,794 to Califano, et al. is directed to an apparatus for stacking and squaring sheets of shingle material. The stacking apparatus includes a pair of "star wheels" having blades which receive sheets of shingle material from a conveyor belt. Once a stack of six to eight sheets have been received on the star wheels, the wheels are counter-rotated in synchronism to release the stack to drop under the influence of gravity to a stack squaring station. After the stack is squared, it again drops to a conveyor to leave the stacking apparatus.

While the sheets in the Califano, et al. device are advanced into the star wheels at a high rate of speed, namely, 350 feet per minute, sequentially adjacent sheets have to be spaced from each other by a distance which will allow the group or stack of shingles to gravitate or drop out of the way of the star wheels during counter rotation to be in a position to receive the next sheet. This requires a minimum separation between sheets of approximately 5 to 6 inches for shingles having a thickness of ⅛th to 3/16ths of an inch. The interval between sheets of shingles is 0.07 to 0.085 seconds. Such an interval between envelopes in an automated mailing machine system would be equivalent to between about 4,000 to about 5,000 pieces of mail per hour. While constituting a substantial rate, it still falls far short of desired target.

U.S. Pat. No. 3,532,230 to Gutberlet, et al. discloses a high-speed stacker for newspapers in which there are pairs of arms on a vertical conveyor that receive newspapers in sequence from a printer. The blades in the stacker are merely lowered until they interrupt the sequential feeding and start a new stack, with each stack being dropped under the influence of gravity onto a conveyor when the blades reach the bottom of the stacker conveyor. This system does not depend upon re-indexing a stacker in the interval between papers, which, in fact, are overlapped as they are received into the stacker.

Another newspaper stacking apparatus is disclosed in U.S. Pat. No. 3,599,807 to Hedrick. The Hedrick stacker is similar to Gutberlet, et al. in that it uses pairs of blades on a vertical conveyor which are driven to intercept overlapped newspapers so as to divide papers into separate stacks. No attempt is made at indexing during an interval between papers.

Another newspaper stacking machine is shown in U.S. Pat. No. 3,861,537 to Duchinsky, et al. The Duchinsky, et al. stacker forms a bundle of newspapers from a plurality of piles of newspapers. A rotary mechanism is used to lift the piles from beneath the bundle to thereby effect stacking of the piles into the bundle. The apparatus, however, is not designed to effect formation of the piles initially and does not have to solve the timing problems associated with formation of the piles.

U.S. Pat. No. 4,460,169 is directed to the stacking of folded napkins or handkerchiefs. A vertical conveyor is employed with counter-rotating star wheels being employed to lower napkins one at a time on to the blades of the vertical conveyor, which is steadily lowering to accommodate the additional napkins. The spacing between napkins, however, is substantial, and each napkin is transferred from the star wheel to the vertical conveyor with gravity maintaining the napkins in contact with the star wheels as they rotate.

In U.S. Pat. No. 4,562,650, a stacking apparatus for veneer, plaster board, fiber board or the like is disclosed. The apparatus, however, is essentially a drying apparatus in which a vertical conveyor merely holds the boards in spaced relation while they dry. There is no timing problem with respect to the separation of stacks.

Accordingly, it is an object of the present invention to provide an automatic mail stacking and separating apparatus and method which are capable of high-speed separating of mail into ZIP code-based stacks for banding and bulk-rate mailing.

Another object of the present invention is to provide an automatic mail stacking and separating apparatus having greatly increased thruput capacity.

Another object of the present invention is to provide an automatic mail stacking and separating apparatus and method which can be used with and retrofit to a wide range of automatic postage machines.

A further object of the present invention is to provide an automatic mail separating and stacking apparatus which is more reliable and jam-free in its operation.

Still another object of the present invention is to provide an automatic mail separating and stacking apparatus which is easily adjusted to accommodate mail of various sizes.

Another object of the present invention is to provide an automatic mail stacking and separating apparatus which forms and delivers mail to banding apparatus in neat, uniform stacks for ease of banding.

Still a further object of the present invention is to provide an automatic mail stacking and separating device which can be used with computerized mail assembly systems, high-speed labelers and web press printing machines to enable mailing at pre-sort mailing rates.

Another object of the present invention is to provide an automatic mail stacking and separating apparatus and method which is relatively inexpensive to construct and operate, is durable, requires less supervision and reduces operator fatigue.

The automatic mail separating and stacking apparatus and method of the present invention have other objects and features of advantage which will become apparent from and are set forth in more detail in the accompanying drawing and following description of Best Mode Of Carrying Out The Invention.

DISCLOSURE OF INVENTION

The high-speed mail stacking and separating apparatus of the present invention includes a stack forming assembly mounted for movement between a stack forming position, at which it serially receives envelopes from a high-speed feed mechanism, to a stack releasing position, at which the stack of envelopes are released for movement to a stack manipulating assembly. The apparatus also includes a drive coupled to drive the stack forming assembly from the stack forming position to the stack releasing position in less time than the time interval between sequentially adjacent envelopes as received from the feeding mechanism. The improvement in the high-speed mail stacking and separating apparatus of the present invention comprises, briefly, a stack impeller mounted for movement during the time interval between sequentially adjacent envelopes into engagement with the stack and for movement to positively displace the stack from the stacking zone by a distance sufficient to permit the stack forming apparatus to be positioned for the formation of another stack.

The method of high-speed mail stacking of the present invention includes the steps of forming a stack of envelopes from serial envelope feeding means on a low-inertia movable stack forming assembly; releasing the stack for gravitation from the stack forming assembly to a stack manipulating assembly; and after the releasing step and during the time interval between sequentially adjacent envelopes, positively impelling the stack of envelopes from the stack forming assembly toward the stack manipulating assembly.

BEST MODE OF CARRYING OUT THE INVENTION

Automated Mailing System

Figure 1:
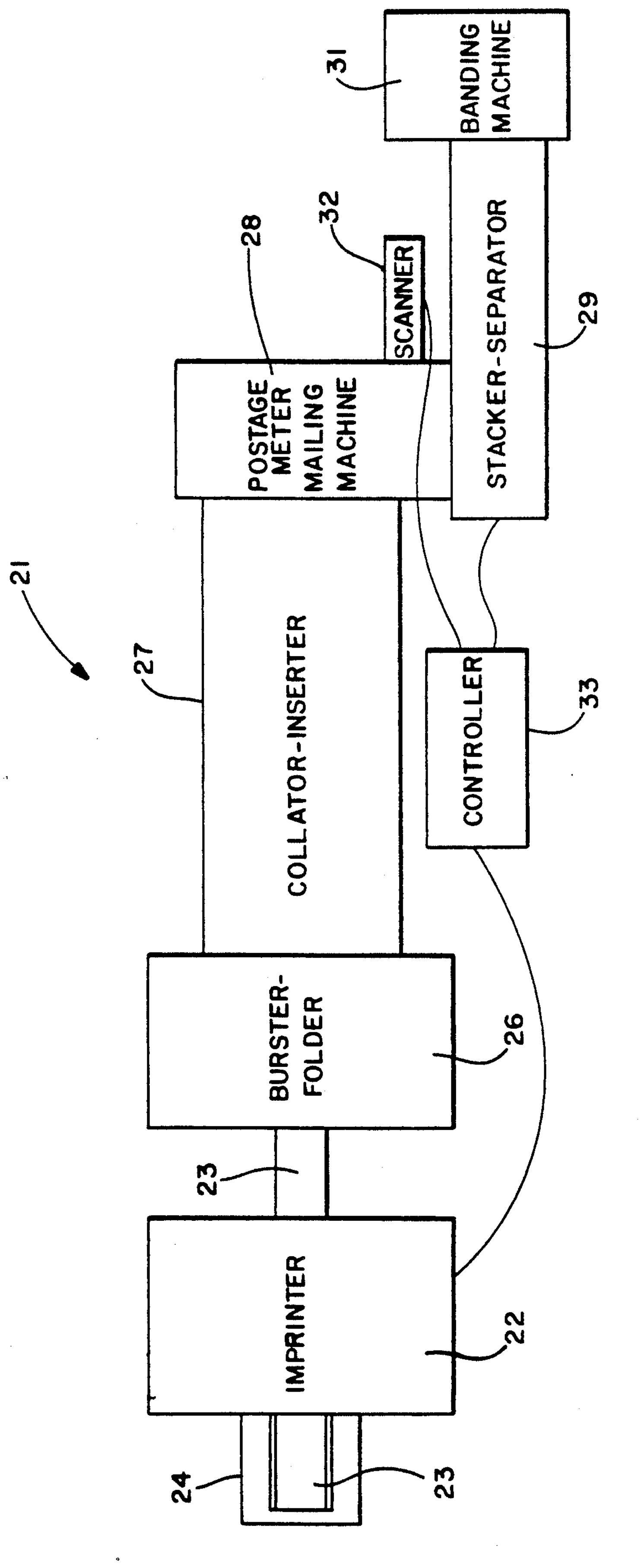
FIG. 1 is a schematic representation of an automated mailing system having a mail stacking and separating apparatus constructed in accordance with the present invention.

A typical high-speed, automated mailing system is shown in FIG. 1. Systems of this type are employed by bulk mailers having a high volume of mail that usually is sent periodically. Thus, a large utility company may send bills or statements monthly, which may or may not include advertisements, bonuses, return envelopes, etc.

Mailing system 21, therefore, includes an imprinter 22 which is computer driven (for example, by controller 33) and prints statements on tractor-feed computer paper 23 stored on paper tray 24. The imprinter not only prints the statements but strips the tractor-feed margins from the paper, which then proceeds to burster-folder 26. At burster-folder 26 the statements are separated from each other, folded and conveyed to a collator-inserter 27. A plurality of feed stations (not shown) are provided at the collator-inserter so that documents which are to be inserted with the statement, if any, can be added to the collection of materials to be mailed. The collator-inserter inserts the statement, with any addition materials into an envelope, which is then transferred to postage meter mailing machine 28. Envelopes containing the statement are sealed at mailing machine 28 and the correct postage is added. The sealed envelopes are then serially or sequentially fed from postage meter mailing machine 28 to a stacker-separator 29. The mail is stacked according to ZIP codes and conveyed to banding machine 31 for banding of the ZIP code-sorted mail in order to enable the mailer to take advantage of the bulk mailing rates.

As thus far described, mailing system 21 is well known in the prior art and the present invention is directed solely to the construction and method of operation of stacker-separator 29. It will be understood, however, that the novel stacker-separator of the present invention and the present method can be used with other mailing systems. Thus, the printing, bursting, folding and inserting might be accomplished through the use of other apparatus or even by hand.

The primary advantages of the present invention reside in its high-speed capability, and accordingly, it is contemplated that input to stacker-separator 29 would be at a high rate in order to fully take advantage of the stacker-separator system. The stacker-separator, however, could be operated at low speeds, but generally it will be fed by a high-speed apparatus, such as, postage meter mailing machine 28, a high speed labeler, or even a web-press printer. One of the advantages of the method and apparatus of the present invention is that stacking and separating envelopes based upon criteria such as ZIP code, can be accomplished at speeds of 60,000 to 70,000 envelopes per hour, with a goal of 100,000 envelopes per hour thought to be achievable. Moreover, the system of the present invention is primarily designed for the handling of mail, but it will be understood that other high-speed stacking of similar sheet-like documents could be accomplished using the apparatus and method of the present invention.

As will be understood, not only imprinter 22, but the entire mailing system 21 will be controlled by controller 33. Envelopes can be imprinted with a bar code that includes ZIP code information, and can be read by optical scanner 32 at postage meter mailing machine 28. The printing process at imprinter 22 will be controlled by computer 33 so as to serially imprint statements having the same ZIP code. Scanner 32 at mailing machine 28 can verify the progress of similarly encoded envelopes and can be used to signal stacker-separator 29 as to changes in ZIP code.

Bulk mailing rates require that a stack of mail have a minimum number of 10 pieces and a maximum height of $3\frac{1}{2}$ inches. Either signals from imprinter 22 or scanner 32 can be used by controller or computer 33 to control the forming of stacks by stacker-separator 29. If the imprinter, for example, is to print sixty two statements with the same ZIP code, the controller can be programmed to stack the sixty two resulting envelopes in one stack of twenty envelopes and two stacks of twenty one envelopes. Scanner 32 can sense and confirm the ZIP code breaks which will cause the stacking program for sixty two envelopes to operate and control the separation of stacks in stacker 29. When the end of the ZIP code is reached, scanner 32 will signal the controller which will calculate the stacking for the next series of envelopes having the same ZIP code.

Stacker-Separator

Figure 2:
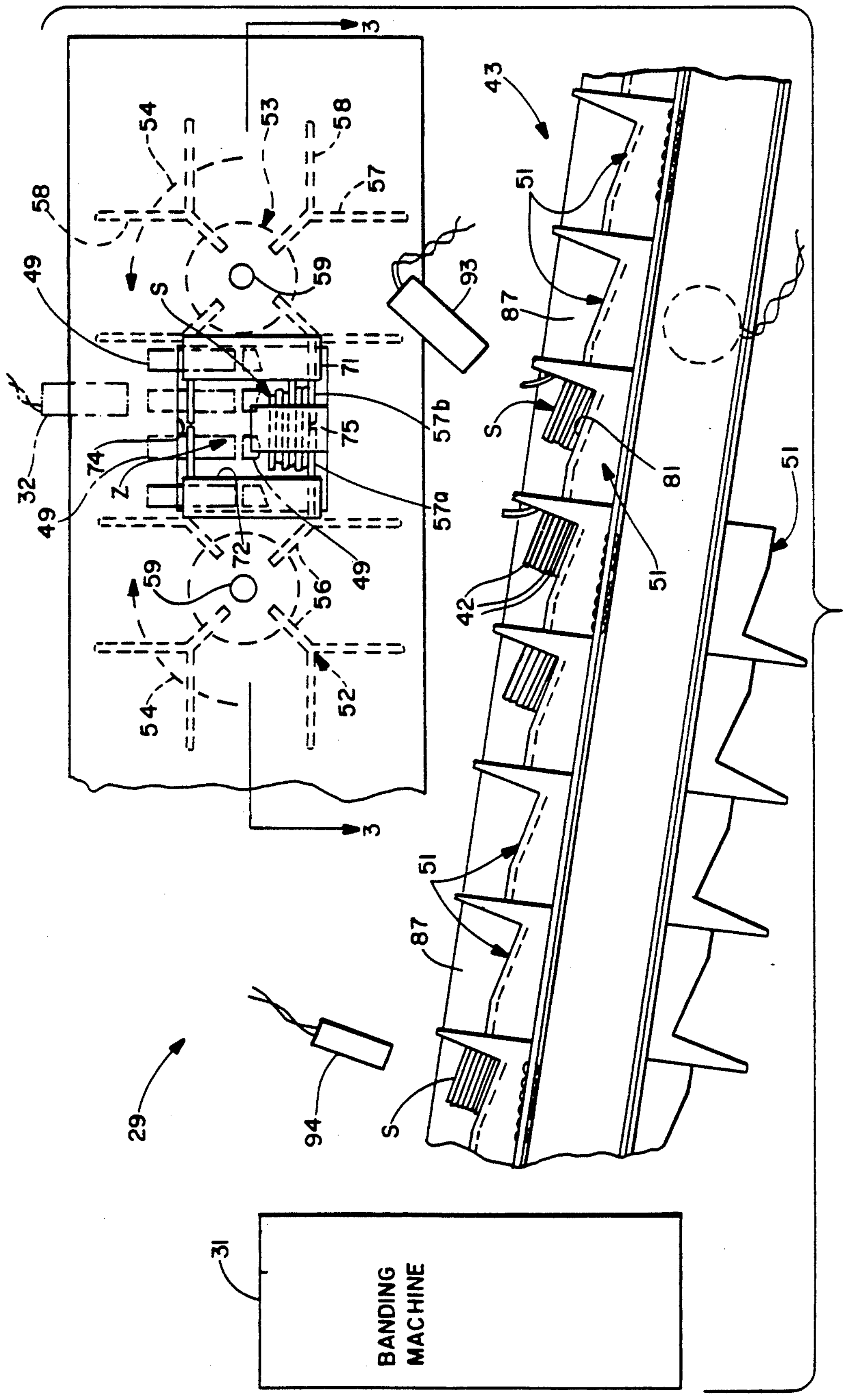
FIG. 2 is a fragmentary, side elevation view of a mail stacking and separating assembly constructed in accordance with the present invention.
Figure 3:
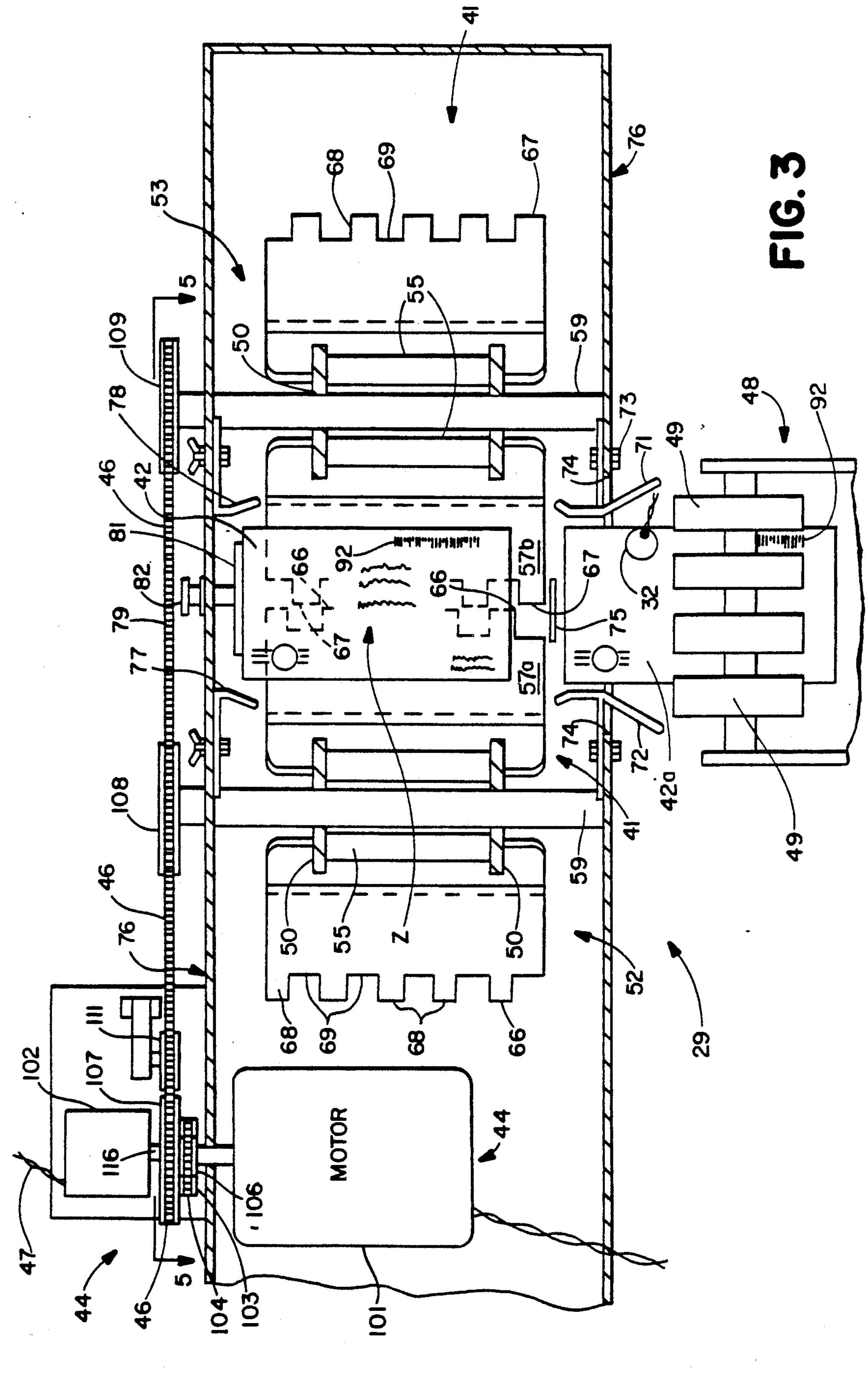
FIG. 3 is an enlarged, top plan view in cross section, taken substantially along the plane of line 3—3 in FIG. 2.
Figure 4:
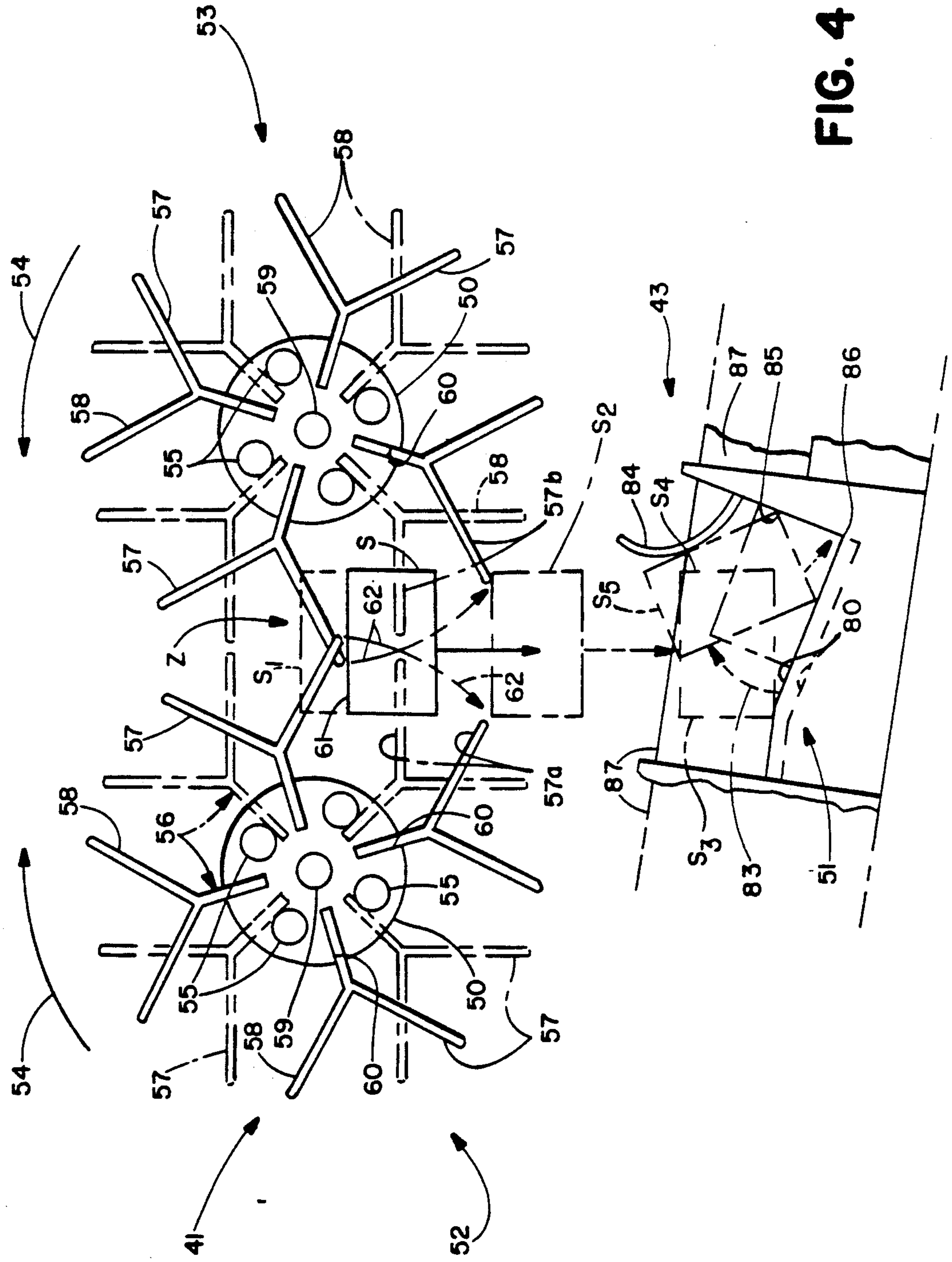
FIG. 4 is an enlarged, fragmentary, cross section view of the combined stacker and impeller portion of the apparatus of FIG. 2.

Referring now to FIGS. 2 through 5, the automated stacker-separator and method of the present invention can be described in detail. Stacking and separating apparatus 29 includes a stack forming assembly, generally designated 41, mounted for movement from a stack forming position, as shown in FIG. 2, to a stack releasing position, as shown in FIG. 4. Assembly 41 receives envelopes 42 in a stacking zone, Z, from a high-speed feed means 48, such as pinch rollers 49 of mailing machine 28, for support of the envelopes in a stack, S. Stack forming assembly 41 moves from the stack forming position of FIG. 2 to a stack releasing position, as shown in solid lines in FIG. 4, for release of stack S for gravitation toward a stack manipulating assembly, in this case conveyor means, generally designated 43.

High-speed mail stacker 41 also includes drive means, generally designated 44 (FIGS. 3 and 5) coupled to drive stack forming assembly 41, for example, by a ribbed timing belt or a drive chain 46 (or a gear train, not shown). Drive means 44 is coupled to controller 33 through conductors 47 so as to drive the stack forming assembly from the stack forming position to the stack releasing position in less time than the time interval between sequentially adjacent envelopes as fed from feed means 48 of a postage meter mailing machine 28 or the like.

As seen in FIG. 3, envelope 42 is positioned in stacking zone Z of stack forming assembly 41, while envelope 42*a* is being fed by pinch rollers 49 into the stack forming assembly. The gap or interval between sequentially adjacent envelopes 42 and 42*a* can be seen to be relatively short. This is required in order to attain high thruput. Drive means 44, therefore, and stack forming assembly 41, must be formed for shifting between the stacking position of FIG. 2 to the stack releasing position of FIG. 4, and back to a new stack receiving and supporting position, all during the time interval between sequentially adjacent envelopes as fed by feed means 48.

In broad concept, such shifting of the stack forming means in the interval between sequentially adjacent envelopes is known in the prior art. In the prior art feed means 48 essentially discharged envelopes directly into conveyor means 43. Thus, conveyor means 43 has a plurality of trays or pockets 51 designed to receive and support stacks S of envelopes 42. In the prior art system, conveyor 43 was simply advanced by one tray during the interval between sequentially adjacent envelopes. The problem with this approach is that the mass of the entire conveyor had to be advanced at the same time. Thus, a relatively high inertia system had to be moved in a relatively short period of time, which required a large and expensive motor to accomplish. The inertia of a multi-tray conveyor, such as conveyor 43, inherently limited the highest speeds which could be achieved using such a prior art stacking technique.

In the present invention, stack forming assembly 41 is positioned in advance of conveyor 43, and stack forming assembly 41 is a relatively low inertia assembly which can be rapidly displaced between the stack forming and stack releasing positions. Still further and in order to obtain very high speeds, stack forming assembly 41 includes stack impeller means mounted for movement into engagement with the stack and for movement to positively displace the stack out of stacking zone Z during the time interval between sequentially adjacent envelopes. Thus, not only is the stack forming assembly 41 a low inertia assembly, but also includes means for positively impelling or displacing the stacks out of the stack forming zone into a stack manipulating assembly, such as conveyor 43. Stack S of envelopes, therefore, is not simply released and allowed to gravitate from assembly 41 to conveyor 43, but it is positively impelled or forced out of the stacking zone of the stacking assembly at a rate exceeding gravitational acceleration. Such positive displacement enables movement of stack forming assembly 41 to a new position which will allow the formation of a new stack in the extremely short period of time between sequentially adjacent envelopes.

Stack forming means 41 includes both of the functions of stacking and positively impelling the stack out of the stacking zone by providing the stack forming apparatus as a pair of star wheel assemblies 52 and 53 which are mounted for counter-rotation, as indicated by arrows 54 in FIGS. 2 and 4. Star wheel assemblies have been employed previously in stacking devices, but they have not been used to positively displace the stack out of the stacking zone. Such prior art star wheel assemblies, for example, as shown in U.S. Pat. No. 3,205,794, merely release the stack for gravitation to the stack handling apparatus.

In order to enable the positive displacement of a stack of envelopes of significant height, the star wheel assemblies 52 and 53 of the present invention preferably are formed with Y-shaped arms 56 having one leg 57 of said arms providing a support surface for envelopes 42 and the other leg 58 providing stack impeller means which positively displaces the stack out of stack forming zone Z and to stack manipulating conveyor 43.

The sequence of stacking and impelling the stack can be described in detail by reference to FIG. 4. Star wheels 52 and 53 are shown in phantom in the stack forming position. Envelopes from feed means 48 will be fed into stacking zone Z and supported on legs or blade ends *57a* and *57b* of the two adjacent star wheels. The Y-shape of arms 56 causes the stack to be formed starting at a position below the central axles 59 of the two star wheels.

When at least 10 envelopes are stacked, and not more than 3½ inches in height of envelopes, controller 33 will rapidly counter-rotate the two star wheels by 90 degrees. As the blades or legs *57a*, *57b* drop out from under stack S, the stack will start to gravitate from the phantom line stacking position $S_1$ toward conveyor 43.

The solid line position in FIG. 4 shows rotation of the stack forming support blades or legs *57a*, *57b* to a position which will allow stack S to pass between blades *57a*, *57b*. Stack S has gravitated down below the phantom line position of blades *57a*, *57b* during this rotation. The upper legs 58 of the star wheels engage the top surface 61 of the envelope stack while it is still in stacking zone Z. As star wheels 52 and 53 continue to rotate, impeller legs 58 will engage upper surface 61 of the stack over the arcuate distances shown by arrows 62 until the stack is in the phantom line position $S_2$. The star wheels continue to rotate until the next stack support leg 57 is positioned in the phantom line position below axles 59. This rotation is a total of 90 degrees.

The exact position at which stack S is "released" or free to gravitate toward conveyor 43 depends upon the rate of rotation of the star wheels. The release position can never be later than the solid line position of FIG. 4, but it usually will occur much earlier since wheels 52 and 53 are rotated by 90 degrees within the time interval between sequentially adjacent envelopes.

Once the stack of envelopes reaches the $S_2$. position, it thereafter continues under the influence of gravity plus the initial velocity imparted by the impeller legs, until it reaches conveyor tray 51. The new stack is being formed on the newly positioned legs 57. Once the original stack reaches the conveyor, the conveyor can be advanced to position a new tray 51 under stack forming assembly 41. The advancement of the new tray, however, need only be accomplished during the time interval for formation of the entire stack, S. Thus, the high inertia conveyor 43 is advanced much more slowly, since the trays need to be re-indexed under the stack forming star wheels during the much longer time interval required to stack a minimum of 10 envelopes. If the gap between envelopes is roughly one-tenth of the length of the envelope, and there are 10 envelopes a minimum stack, the re-indexing of conveyor 43 can be accomplished in a time interval which is 100 times longer than the time interval for re-indexing or rotating star wheels 52 and 53. When stacks as high 3½ are formed, the time interval for re-indexing indexing of the conveyor is much longer.

Star wheel assemblies 52 and 53 are shown with four arm 56, each of which are Y-shaped. This positions one of the legs forming the arm ends in a horizontal plane in the stack supporting position, while that same leg on the preceding arm 56 is rotated to an incline plane in the stack releasing position.

In the form of the star wheel shown in the drawing, four arms 56 are employed. It will be understood, however, that other numbers of arms also are suitable for use in the present invention.

The number of arms on star wheels 52 and 53 can be varied from one to n. If a single arm is used, it should be a straight arm which is stopped at a horizontal plane and rotated by 360 degrees so that the upwardly facing surface supports the stack during stack formation and the downwardly facing surface acts as the impeller to positively displace the stack out of the stacking zone. The disadvantage of using a single arm is that the rotational speed must be very high in order to accomplish a complete revolution in the time interval between sequentially adjacent envelopes.

For star wheels having two arms or more, the arms should be formed with Y-shaped ends with the include angle between the arms equaling 360°/n and the angle from a horizontal plane at which the base portions 56 of the arms are stopped for stacking being 180°/n. Thus, a two arm star wheel would have a Y-shape that was flat, essentially a T-shaped end, and would be stopped with the base portions of the arms in a vertical plane. A three arm star wheel would have 120 degrees between the leg portions and will be stopped at 60 degrees below a horizontal plane.

While it is preferable that the impeller means be formed as a blade or leg 58 on a common movable assembly with the stack forming blade or arm 57. It will be appreciated, however, that a first pair of counter-rotating straight-armed star wheels might be used for stacking of envelopes 42, while a second straight-armed star wheel rotated by 90 degrees also might be employed as the impeller means. As the first pair of star wheels rotated out of the way to release the stack, the star wheel at 90° (having an axis of rotation parallel to the sheet containing FIG. 4) might rotate down into engagement with the stack for propulsion of the stack out of the stacking zone. This approach is possible, but requires at least one additional star wheel and means for controlling the same in indexed relation relative to the stacking star wheels.

As the number of arms in the star wheels increases, the length of the arms must increase in order to afford a space between circumferentially adjacent arms sufficient to receive a 3½ inch high stack of envelopes. This increased arm length in turn adds to star wheel inertia, and it has been found that a four arm star wheel is particularly well suited for use in connection with stacking mail.

In order to fully support the envelopes 42 which can be somewhat flexible, it is preferable that the star wheels be formed with arms which have ends that are in substantially abutting relation in the stack forming position. As may be seen in FIG. 3, therefore, the ends 66 and 67 of opposing stacking legs **57*a* and 57*b* are substantially abutting in the stacking position, which is 45 degrees below axles 59. When the ends 66 and 67 pass through the horizontal plane between the axles, however, they would interfere with each other or radially overlap. Accordingly, it is preferred that the ends 66 and 67 be formed with mating, staggered protrusions 68 and spaces or recesses 69 to permit passage of the arms through a horizontal plane between the axles 59. This construction provides for full support of envelopes 42 over their width while they are being stacked on blades or ends 57**.

As illustrated in FIGS. 3 and 4, low-inertia star wheel assemblies 52 and 53 include a pair of disk-like members 50 which are secured for rotation with axles 59. Extending between disks 50 are four assembly stiffening tubes 55. Y-shaped arms 56, therefore, are secured in slots 60 in disks 50 in between the stiffening tubes, and arms 56 extend between and beyond disks 50. This structure affords a star wheel which has high strength and yet low inertia.

Centering of envelopes 42 on the stacking legs or blades 57 can be accomplished by guide means formed to receive and guide the envelopes from feed means 48. Thus, a pair of guide flanges 71 and 72 can be adjustably mounted by fasteners 73 proximate a front opening 74 to stacking housing 76. Guide flanges 71 and 72 can be adjusted laterally to change the effective width of the opening through which envelopes are fed to substantially match the envelopes being stacked.

It is further preferable that a second pair of guides 77 and 78 be adjustably mounted to back wall 79 of stacking housing 76. Optionally, a stop plate 81 also can be adjustably mounted to housing back wall 79 by threaded assembly 82. This allows the stack of envelopes to be stopped in selected positions along the stacking blades or legs 57. As will be appreciated, end wall 79 can also perform the function of acting as a stop for the envelopes as they are discharged into the stacking zone by feed means 48.

As best may be seen in FIG. 2, the pinch rollers 49 of feed means 48 must be positioned above stacking blades **57*a* and 57*b* by a height sufficient to allow stacking of the maximum desirable stack on the stacking blades. Since maximum stack height permissible for bulk mailing is 3½ inches, the pinch rollers 49 will normally be positioned at least 3½ inches above the blades 57*a*, 57*b*. As will be appreciated, banding of the stacks of envelopes by banding machine 31 will reduce the overall stack height, and normally the pinch rollers will deliver envelopes to the stacking zone and stacking apparatus at a distance about 6 inches above blades 57*a*, 57*b***.

As also can be seen from FIG. 2, the guide flanges 71 and 72 extend substantially over the full height of opening 74. Similarly, the back guides 77 and 78 will extend preferably from a position below the stacking blades 57 to a position proximate or above the impeller blades 58.

Since envelopes 42 are ejected at high speed from pinch rollers 49 into stacking zone Z, there is a tendency for the envelopes to rebound back from stop plate 81 back toward opening 74 and the pinch rollers. Accordingly, it is preferable to position a rebound deflector 75 proximate the front ends of the star wheels. Deflector 75 extends upwardly from stacking blades **57*a*, 57*b* to a position just below the pinch rollers (FIGS. 2 and 3). Pinch rollers 49, therefore, propel the envelopes into the stacker just over deflector 75. Envelopes 42 hit stop 81, drop and rebound back against deflector 75 and finally drop onto blades 57*a*, 57*b***.

Figure 5:
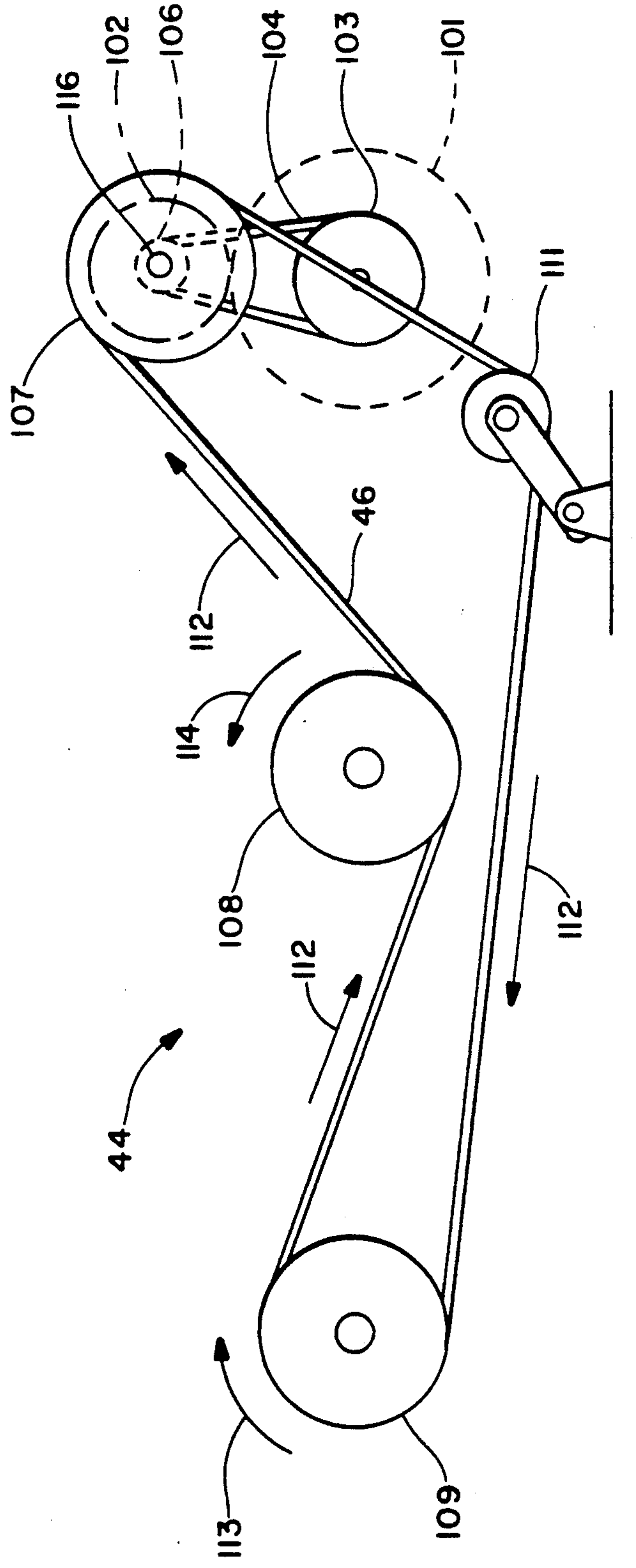
FIG. 5 is a side elevation view of a schematic representation of the drive assembly taken substantially along the plane of line 5—5 in FIG. 3.

Counter-rotation of star wheels 52 and 53 can be achieved by various drive means 44. As shown in FIGS. 3 and 5, drive means 44 includes motor 101, clutch 102 a plurality of drive pulley and drive belt 46. A motor drive pulley 103 has a gear or toothed belt 104 mounted thereon and mounted on a small diameter clutch pulley 106. Drive belt 46 is mounted to large diameter clutch pulley 107 and extends over star wheel pulley 108 and 109. An adjustable tension pulley 111 is mounted to tension belt 46 and to hold the belt away from pulley 108.

As best may be seen in FIG. 5, therefore, when belt 46 is advanced in the direction of arrow 112, pulley drive 109, which drives star wheel 53, is driven in the direction of arrow 113, which drive wheel 108 is counter-rotated in the direction of arrow 114.

In drive assembly 44 motor 101 is a continuously running motor, while clutch 102 is a four division wrap spring clutch that is actuated by commands from controller 33 through conductors 47. The signal from controller 33 causes a solenoid latch in clutch 101 to couple clutch pulley 107 to shaft 116 for rotation with pulley 106 for one-quarter of one revolution. Since pulleys 107, 108 and 109 are all the same diameter, both star wheel drive pulley 108 and 109, and star wheels 52 and 53 are counter-rotated by one-quarter turn or 90 degrees.

As will be appreciated, it also is possible to use a single revolution clutch and gearing to produce a 4 to 1 reduction in order to achieve synchronized one-quarter revolution counter-rotating star wheels. In order to minimize slippage and maintain synchronism belt 46 is a double gear belt, namely, a timing belt having teeth or notches on both faces or sides. This allows driving of pulley 109 from the inside of belt 46 and driving of pulley 108 from an outside.

Envelope stack conveyor 43 is formed to receive the unbanded stack S, as impelled at high speed from stacker 41, and conveyor 43 also aligns or trues-up the stack before it is delivered to banding machine 31. As best may be seen in FIG. 4, stack S leaves the impelling legs 58 at position $S_2$. The stack is travelling at a high rate of speed when it leaves impeller legs 58, and it will impact tray 51 at an orientation $S_3$. Since the stack is loosely stacked, there will be a tendency for the stack to compress as it is decelerated at tray 51 and simply slide down sloped surface 80 until the side of the stack is engaged by the upstanding back wall 85 of the tray. The stack of envelopes will, in most cases, move directly from position $S_3$ to position $S_4$.

In some instances, however, the stack may rebound up from incline surface 80, as indicated by arrow 83, so that the upper envelopes of the stack will be inclined as shown in phantom by position $S_5$. In order to insure that the stack does not become skewed or cocked at an angle in tray 51, tray assembly 51 preferably includes stack rebound deflecting guide 84 which will engage the uppermost envelopes in the stack and force them back toward slope surface 80. Rebound guide 84 is positioned to permit the stack to pass beyond the guide and land on tray surface 80, but it is also positioned so that an envelope at apex 86 of the tray will always be tilted slightly toward surface 80 so that the envelope will fall back toward surface 80.

Additionally, tray surface 80 slopes in a downward direction toward a stationary back wall or plate 87 that extends along one side of conveyor 43. The wall or plate 87 acts in combination with the rearwardly sloped surface 80 and the upstanding wall 85 to true the stack S as it is conveyed from stacker 41 to banding machine 31. As the trays move along next to wall 87, the protruding envelopes rub against stationary wall 87 and are effectively forced against upstanding back wall 85 to square one side of the stack. The slope of surface 80 toward stationary wall 87 also tends to square up the ends of the envelopes engaging wall 87. When stack S reaches the banding machine, therefore, it is in a relatively tight stack that makes handling in the banding apparatus more easily accomplished.

It is preferable that banding apparatus 31 include a stack handling tray and band expansion assembly as set forth in U.S. Pat. No. 4,601,155 and that the banding machine include a rubber band cutting apparatus as disclosed in U.S. Pat. No. 4,579,027, but other forms of envelope banding apparatus are suitable for use with the stacking and conveying assembly of the present invention.

Controlling of the operation of stack forming apparatus 41 and stack conveying apparatus 43 preferably is accomplished through the use of sensors that are coupled to controller 33. Thus, a bar code reader 32 can be positioned proximate (either in front of or after) pinch rollers 49 so as to read bar code 92 on envelopes 42. The bar code reader can be used to confirm the arrival of a change in ZIP code which will require the controller to compute new stacking sizes.

A photosensor 93, additionally, is preferably provided above conveyor 43 to sense when a stack S is positioned in tray 51 below the stacker. Once stack 51 is so positioned, the conveyor can be advanced to position the next tray for receipt of the next stack. A photosensor 94 at the end of conveyor 43 will indicate when a tray having a stack of mail in it reaches banding machine 31. The banding machine similarly will have sensors so that progress of the stacks through the banding operation can be followed.

When minimal stacks of 10 pieces of mail are being formed, stacks can be delivered to banding machine 31 at a rate which would exceed the capacity of the banding machine if every tray were filled with the stack. Accordingly, conveyor 43 is sometimes advanced more than one tray so as to produce a gap that will accommodate the banding machine band applying rate. Thus, the sensor 94 confirms the presence or absence of a stack in the tray from the conveyor which will be transferred to banding machine 31.

Mail Stacking and Separating Method

Having described the apparatus of the present invention, the high-speed mail stacking method of the present invention can now be described. The present method includes the steps of forming a stack S of envelopes 42 which are serially fed from feed means 48. The forming step is accomplished by feeding the envelopes to a low-inertia, movable stack forming assembly 41. During the interval between sequentially adjacent envelopes 42, the previously stacked envelopes are released for movement to stack handling means 43. In the method of the present invention, stack S is positively impelled from the stacking zone Z, or stack forming apparatus 41, toward the stack manipulating apparatus 43 by a distance sufficient to enable the stack forming apparatus to be repositioned for the formation of another stack. The positive impelling step of the method of the present invention is preferably accomplished by counter-rotation of side-by-side star wheels 52 and 53 having arms 56 which include stack impelling legs 58 that engage and displace the stack out of the stacking apparatus as the arms are rotated. The same star wheels can be rotated further to position another leg 57 for support of the next stack of envelopes.

What is claimed is:

1. In a high-speed mail stacking and separating apparatus including a stack forming assembly mounted for movement from a stack forming position, for sequential receipt of envelopes from a high-speed envelope feeding means and for support of a stack of said envelopes in a stacking zone, to a stack releasing position, for release of said stack for movement out of said stacking zone, said stack forming assembly including two star wheel assemblies mounted side-by-side for rotation about horizontal axes and said star wheel assemblies each having a plurality of radially extending arms; drive means coupled to drive both said star wheel assemblies and counter-rotate said star wheel assemblies to sequentially position one arm after another in said stack forming position and thereafter rotate said arms to said stack releasing position in less time than the time interval between sequentially adjacent envelopes as fed from said high-speed feeding means; and stack impeller means mounted for movement into engagement with said stack and for movement to positively displace said stack out of said stacking zone during said time interval between adjacent envelopes to permit said stack forming apparatus to be positioned during said time interval between adjacent envelopes for formation of another stack; the improvement in said stacking apparatus comprising:

said star wheel assemblies each having four radially extending arms, and said arms being Y-shaped with a base portion and a pair of legs extending from said base portion, said legs having an included angle between said legs of 90 degrees and an angle of 135 degrees between said legs and said base portion; and said drive means positioning the base portions of said arms at 45 degrees above and below a horizontal plane in said stack forming position and rotating said arms by 90 degrees to both positively displace said stack form said stacking zone and to position a second of said arms in said stack forming position to receive another stack.

2. The mail stacking and separating apparatus as defined in claim 1 wherein, opposed ends of said Y-shaped arms are in substantially abutting relation in said stack forming position for full support of the width of said envelopes.

3. The mail stacking and separating apparatus as defined in claim 1 wherein, corresponding arms on said star wheel assemblies are formed with protrusions and mating spaces on abutting ends to permit passage of said arms through a horizontal plane.

4. The mail stacking and separating apparatus as defined in claim 1, and stack manipulating means positioned to receive said stack as displaced from said stacking zone, said stack manipulating means being provided as a conveyor assembly including a plurality of movable stack receiving trays, said stack receiving trays each include stack rebound deflecting means;

said stack receiving trays have an open end;

a stationary wall positioned proximate said stack receiving trays at said open end; and said stack receiving trays have a stack supporting surface sloping toward said stationary wall.

* * * * *